United States Patent [19]

Lantrip

[11] 4,024,651

[45] May 24, 1977

[54] VARIABLE FEEL SIDE STICK CONTROLLER

[75] Inventor: David B. Lantrip, Oxnard, Calif.

[73] Assignee: The United States of America as represented by the Secretary of the Navy, Washington, D.C.

[22] Filed: Apr. 27, 1976

[21] Appl. No.: 680,651

[52] U.S. Cl. .............................. 35/12 S; 244/83 D
[51] Int. Cl.² ......................................... G09B 9/08
[58] Field of Search .......... 35/9 R, 9 A, 10.2, 12 S, 35/12 R, 12 E, 12 F, 12 K, 12 N, 12 P, 12 W, 22 R; 272/1 C, 17, 18; 244/83 D, 83 F; 340/27 NA

[56] References Cited

UNITED STATES PATENTS

| | | | |
|---|---|---|---|
| 2,522,434 | 9/1950 | Dehmel | 35/12 S |
| 2,627,675 | 2/1953 | Kittredge | 35/12 S |
| 3,023,516 | 3/1962 | Eisenberg | 35/12 S |
| 3,031,775 | 5/1962 | Cohen | 35/12 S |
| 3,228,478 | 1/1966 | Edenborough | 344/83 F X |
| 3,508,346 | 4/1970 | Norman et al. | 35/12 N |
| 3,805,413 | 4/1974 | Burny et al. | 35/12 S |

Primary Examiner—Richard C. Pinkham
Assistant Examiner—Vance Y. Hum
Attorney, Agent, or Firm—Richard S. Sciascia; Joseph M. St.Amand; William W. Cochran, II

[57] ABSTRACT

A variable feel side stick controller for producing and regulating feedback forces on a side stick for optimum pilot response. The controller consists of the floating table assembly which transfers the three-dimensional motion of the side stick into a two-dimensional motion. A series of hydraulic cylinders mounted on the floating table which are connected to a series of hydraulic circuits regulate the feedback forces produced on the side stick. The instantaneous position of the side stick can be determined from a series of linear potentiometers coupled to the hydraulic cylinders or from a series of force transducers connected to the hydraulic circuits. The two-dimensional floating table assembly allows use of a cam and cam follower arrangement which allows the force field to be varied with the shape of the cam.

18 Claims, 3 Drawing Figures

VARIABLE FEEL SIDE STICK CONTROLLER

BACKGROUND OF THE INVENTION

The present invention pertains generally to simulators and more specifically to a variable feel side stick controller. Airplane control systems have generally relied on powered hydraulic systems to steer the plane. By using these powered hydraulic control systems, feedback forces from the airplane controls which are prevalent in mechanical link systems are often times greatly changed or even eliminated. This tactile feedback provides an indication to the operator of the aircraft of how far he had moved the side stick from the zero position.

The conventional method of achieving these feedback forces has been to project the hemispherical motion of the side stick onto a horizontal Cartesian plane and thereafter using springs to independently restrict motion in both the X and Y directions. This method of providing feedback forces has proved adequate for small angular displacements of the stick and small restraining forces. However, angular stick displacements which are fairly large, e.g., up to 50°, and high magnitude retaining forces, e.g., up to a hundred pounds or more, cannot be uniformly provided using the spring arrangement.

Presumably a set of feedback forces can be designed to provide optimum pilot response. For example, it would be desirable to vary the force differential on the side stick proportionally to the displacement of the side stick and test pilots for optimum response. Similarly, the ability to independently vary the feedback force on the side stick proportionally to the angular velocity of the side stick would provide empirical data for optimum feedback of this type of force system, in addition. Spring systems have been unable to independently vary these parameters so that optimum pilot response may be tested.

At the same time a system has been needed which was capable of monitoring stick position and feedback force with high resolution, i.e., within one degree and ½ pound, respectively. Also, the depth of the device should allow the operator to sit during the testing periods in a comfortable position such that he can comfortably reach the side stick and maintain a relaxed posture during any maneuver of the stick.

It is therefore an object of the present invention to provide an improved variable feel side stick controller.

It is also an object of the present invention to provide a variable feel side stick controller which is capable of independently varying feedback forces proportional to displacements and angular velocity.

Another object of the present invention is to provide a variable feel side stick controller which is capable of providing isotonic feedback forces.

Another object of the present invention is to provide a variable feel side stick controller which is capable of providing linear feedback forces over large displacement angles.

Another object of the present invention is to provide a variable feel side stick controller capable of providing high magnitude linear feedback forces.

Another object of the present invention is to provide a variable feel side stick controller capable of monitoring side stick position with high resolution.

Another object of the present invention is to provide a variable feel side stick controller which is capable of monitoring feedback forces with high resolution.

Another object of the present invention is to provide a variable feel side stick controller which is compact in design allowing an operator to sit during operation of the side stick and maintain a relaxed posture during any maneuver of the stick.

Another object of the present invention is to provide a variable feel side stick controller which is capable of providing a symmetrical and non-linear feedback force to compensate anthropomorphic irregularities.

Other objects and further scope of applicability of the present invention will become apparent in the detailed description hereinafter. The detailed description indicating the preferred embodiment of the invention is given only by way of illustration since various changes and modifications within the spirit and scope of the invention will become apparent to those skilled in the art from the detailed description. The foregoing abstract of the disclosure is for the purpose of providing a non-legal brief statement to serve as a searching and scanning tool for scientists, engineers and researches and is not intended to limit the scope of the invention as disclosed herein nor is it intended to be used in interpreting or in any way limiting the scope or fair meaning of the appended claims.

SUMMARY OF THE INVENTION

These objects are accomplished in accordance with the present invention by providing an improved variable feel side stick controller. The side stick controller of the preferred embodiment of the invention utilizes a floating table gimbal mounted to the side stick which transfers the hemispherical motion of the side stick to rectilinear motion. A series of hydraulic cylinders are orthogonally connected to the floating table and have shafts connected to cam followers. The cam followers follow a circular cam in which the floating table is located such that movement of the side stick causes a displacement of fluid within the hydraulic cylinders indicative of and proportional to the displacement of the side stick. Two independent hydraulic circuits are connected to two cells of the hydraulic cylinders to independently control feedback forces proportional to displacemet and angular velocity of the side stick.

DETAILED DESCRIPTION OF THE PREFERRED EMBODIMENT

Figure 1:
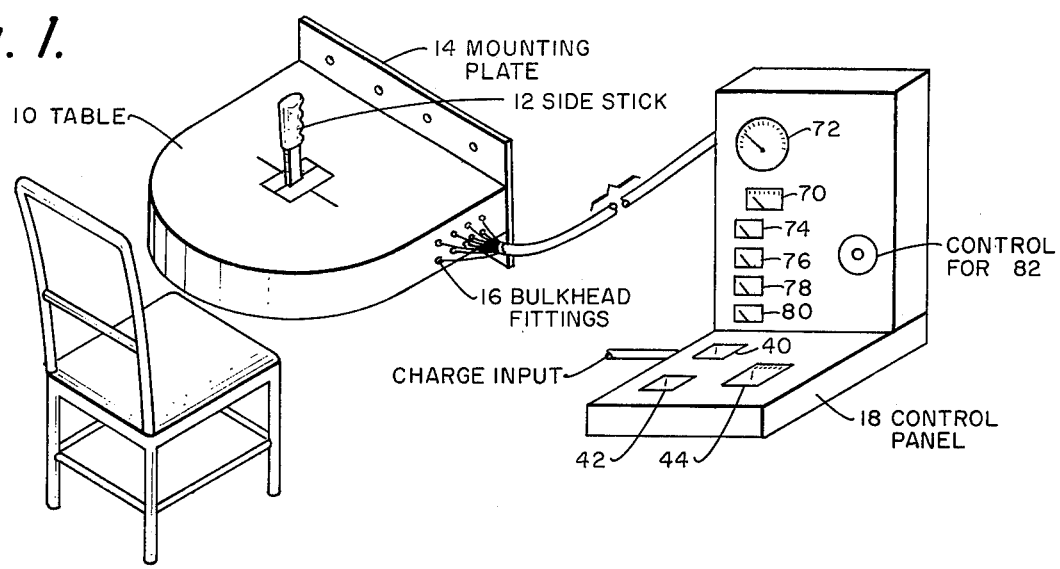
FIG. 1 is a perspective drawing of the system of the preferred embodiment of the invention.

FIG. 1 illustrates, in a perspective view, the physical arrangement of the system of the preferred embodiment of the invention. The mechanical elements of the system are arranged within the table 10 which can be mounted conveniently with mounting plate 14 such that the operator of the system can easily position himself in a sitting position such that a relaxed posture can be maintained during any maneuver of the side stick 12. Bulkhead fittings 16 allow the hydraulic lines which are connected to the control panel 18 to be disconnected for transport. As shown in FIG. 1, the table 10 contains physical elements illustrated in FIG. 2 while the elements shown in FIG. 3 are basically contained within the control panel 18.

Figure 2:
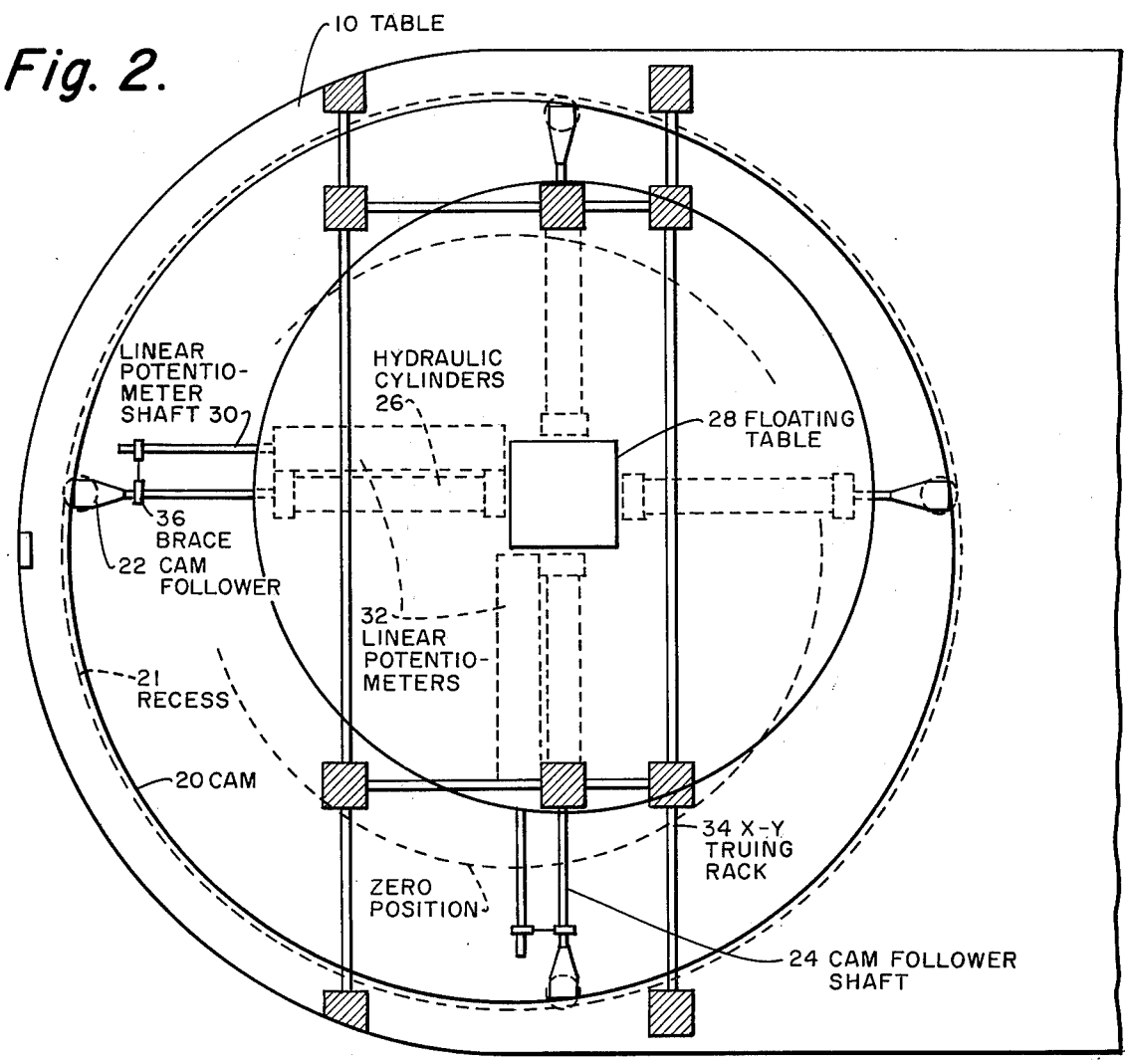
FIG. 2 illustrates the mechanical control mechanisms within the table of the preferred embodiment of the invention.

Turning to FIG. 2, the elements of the table 10 are schematically shown in a top view. The table 10 contains a cam 20 having a recessed portion 21 in which a series of cam followers 22 are positioned. The cam follower shaft 24 is connected to the cam followers and transfers the orthogonal motion of the cam follower to a series of orthogonally mounted hydraulic cylinders 26 which are mounted on a floating table 28. The floating table 28 is mounted on an X–Y truing rack 34 such that hemispherical motion of the side stick 12 is translated into a rectilinear motion in the Cartesian plane of the truing rack. A pair of linear potentiometers 32 are also mounted to the floating table 28 and have shafts 30 which are coupled to the cam follower shaft 22 via brace 36. Orthogonal motion of the floating table can therefore be detected by monitoring the resistance of the linear potentiometers 32.

Figure 3:
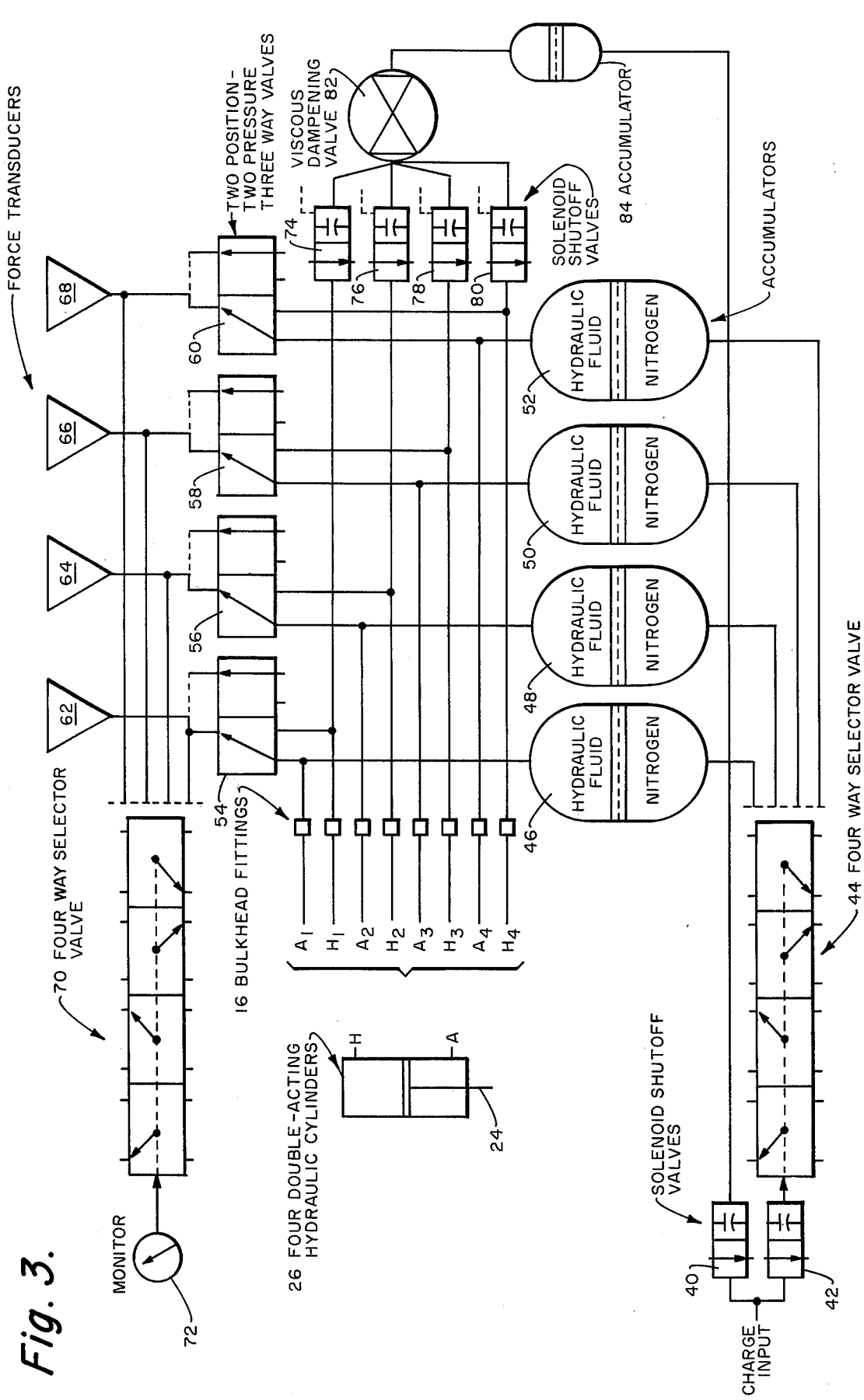
FIG. 3 is a schematic drawing of the hydraulic circuits of the preferred embodiment of the invention.

FIG. 3 illustrates the hydraulic circuitry of the preferred embodiment of the invention. The hydraulic cylinders 26 comprise four double-acting hydraulic cylinders each having two control cells and two control ports A and H. Each of the control cells controls the action of the hydraulic cylinders 26 and displaces hydraulic fluid in both cells upon movement of the shaft 24. The A circuitry, as shown in FIG. 1, is connected to a series of accumulators 46 through 52. As hydraulic fluid is displaced, nitrogen is compressed within the accumulators causing a feedback force at the hydraulic cylinders which is linearly proportional to displacement, The accumulators 46 through 52 are charged through the charge input solenoid shut-off valve 42 and four-way selector valve 44. By increasing the charge within the accumulators, the feedback force proportional to displacement is increased. In addition, by varying the charges on the accumulators, the zero position of the side stick is also varied.

The linearity of the displacement feedback force is also dependent on the shape of the cam 20. In a system where the forces in the X and Y direction are completely independent of one another, displacements at 45 degreee angle reflect a greater feedback force than those displacements in the X and Y directions. As shown in FIG. 2, however, displacement along the line of any of the hydraulic cylinders (X and Y directions) also causes displacement of orthogonally mounted cylinders, due to the use of a circular cam, thereby increasing the feedback force in the line of the hydraulic cylinders to move equally match 45 degreee displacements. The force around the entire perimeter of movement of the side stick 12 can therefore be made equal, if desired, by varying the shape of the cam 20. Of course, the cam 20 can be shaped in any desired manner to produce any desired feedback force.

Force transducers 62 through 68 monitor, with high resolution, the amount of force placed on the side stick 12. Four-way selector valve 70 which is coupled to monitor 72 selects the specific force transducer to be monitored. The hydraulic circuit H is connected from the hydraulic cylinders 26 to solenoid shut-off valves 74 through 80. When the solenoid shut-off valves 74 through 80 are activated, thereby closing the hydraulic circuit, the system is placed in the isotonic mode of operation. In this mode, movement of the side stick 12 is virtually. eliminated. Forces produced on the side stick are detected by force transducers 62 through 68 when the two position, two pressure, three-way valves 54 through 60 are switched to the H circuit. Solenoid shut-off valves 74 through 80 can also be operated to separately and independently restrict or throttle each of the hydraulic lines in the H circuit so that feedback force proportional to angular velocity of motion of the side stick 12 can be varied in any direction. This allows optimum performance tests with compensations made for differences in arm strength according to the direction of movement of the side stick 12 and other anthropomorphic irregularities. Deactivation of solenoid switches 74 through 80 allows the system to operate in a dynamic mode, in which motion of the stick can be dampened by viscous dampening valve 82. The viscous dampening valve, as more fully disclosed in Application Ser. No. 674,206, filed on 6 Apr. 1976 by David B. Lantrip entitled "A VALUE FOR INDEPENDENTLY THROTTLING A PLURALITY OF HYDRAULIC LINES," functions to simultaneously and equally throttle each of the hydraulic lines of the hydraulic circuit such that a feedback force is produced on the side stick 12 which is proportional to angular velocity of the side stick 12. The magnitude of viscous dampening is controlled by the amount which the valve is regulated to throttle the hydraulic fluid. Accumulator 84 is used to absorb sudden shocks placed on the side stick 12. Accumulator 84 is charge separately through solenoid shut-off valve 40.

The dual hydraulic systems A and H therefore act as independent circuits for controlling feedback forces on side stick 12 through the hydraulic cylinders 26. A feedback force which is proportional to the angular movement or velocity of the side stick can, in this manner, be independently varied by viscous dampening valve 82. Similarly, a linear force proportional to total displacement of the side stick 12 can be independently varied by varying the amount of pressure placed in accumulators 46 through 52. Unequal pressure in the accumulators 46 through 52 also allows adjustment of the zero position of the side stick. Activation of the solenoid shut-off valves 74 through 80 places the system in an isotonic mode of operation to test instantaneous pilot reaction to the force transducers 62 through 68. Additionally, the overall design of the system allows the operator to position himself so that any movement of the side stick can be made while maintaining a relaxed posture. Also, stick displacement can be determined with high resolution by monitoring the linear potentiometers 32. This provides calibration of operator response for selecting feedback forces for optimizing operator performance.

Obviously many modifications and variations of the present invention are possible in light of the above teachings. It is therefore to be understood that within the scope of the appended claims the invention may be practiced otherwise than as specifically described.

What is claimed is:

1. A variable feel side stick controller having a side stick
    a. floating table means gimbal mounted to said side stick for translating side stick motion to rectilinear motion in a Cartesian plane;
    b. a plurality of hydraulic cylinders connected to said floating table;
    c. cam means connected to said hydraulic cylinders for displacing hydraulic fluid in said plurality of hydraulic cylinders indicative of displacement of said side stick;

d. viscous dampening means for producing and regulating a feedback force at said side stick proportional to angular velocity of said side stick; and e. accumulator means for producing and regulating a feedback force at said side stick which is proportional to displacement of said side stick.

2. The controller of claim 1 further comprising means for monitoring the position of said side stick.

3. The controller of claim 2 wherein said means for monitoring comprises a plurality of linear potentiometers coupled to said cam means.

4. The controller of claim 2 wherein said means for monitoring comprises a plurality of force transducers coupled to said plurality of hydraulic cylinders.

5. The controller of claim 1 wherein said cam means comprises a circular cam surrounding said floating table and a plurality of cam followers coupled to said plurality of hydraulic cylinders.

6. The controller of claim 1 wherein said viscous dampening means comprises multiple port valve means for simultaneously and equally throttling said hydraulic fluid displaced by said plurality of hydraulic cylinders.

7. The controller of claim 1 wherein said accumulator means comprises a plurality of charge cylinders for positioning a zeroing displacement feedback force proportionally to charges applied to said charged cylinders.

8. The controller of claim 1 further comprising valve means coupled to said plurality of hydraulic cylinders for operation of said side stick controller in an isotonic mode.

9. The controller of claim 8 wherein said means for monitoring comprises a plurality of force transducers coupled to said plurality of hydraulic cylinders.

10. The controller of claim 1 wherein said plurality of hydraulic cylinders comprise double acting cylinders each having first and second control ports for independently controlling said plurality of hydraulic cylinders, said first control port connected to said viscous dampening means and said second control port connected to said accumulator means.

11. The controller of claim 1 wherein said cam means can be varied in shape to vary said feedback force proportional to displacement according to direction of displacement of said side stick.

12. A variable feel side stick controller having a side stick comprising:

a. an X-Y truing rack responsive to movement of said side stick for translating side stick motion to planar motion;

b. double acting hydraulic cylinder means mounted in the plane of said X-Y truing rack and having a first and second cell;

c. first hydraulic circuit means connected to a first cell in said double acting hydraulic cylinder means for producing a zeroing feedback force wherein displacement of said side stick is proportional to force magnitude; and d. second hydraulic circuit means connected to a second cell in said double acting hydraulic cylinder means for producing a feedback force which is proportional to angular velocity of said side stick.

13. The controller of claim 12 wherein said side stick is double gimbal mounted on a mounting board and said X-Y truing rack, allowing said side stick to pivot to angles greater than fifty degrees.

14. The controller of claim 12 further comprising means for monitoring the position of said side stick.

15. The controller of claim 14 wherein said means for monitoring comprises a plurality of linear potentiometers coupled to said cam means.

16. The controller of claim 14 wherein said means for monitoring comprises a plurality of force transducers coupled to said plurality of hydraulic cylinders.

17. The controller of claim 12 further comprising valve means coupled to said hydraulic cylinder means for operation of said side stick controller in an isotonic mode.

18. The controller of claim 12 further comprising valve means coupled to said hydraulic cylinder means for separately and independently throttling a plurality of hydraulic lines of said second hydraulic circuit means to execute optimum performance tests compensating for anthropomorphic irregularities.

* * * * *